(12) United States Patent
Knobloch (10) Patent No.: US 10,194,571 B2
(45) Date of Patent: Feb. 5, 2019

(54) INDEXED SEEDBED TILLAGE ARRANGEMENT

(71) Applicant: CNH Industrial America LLC, New Holland, PA (US)

(72) Inventor: Dean A. Knobloch, Tucson, AZ (US)

(73) Assignee: CNH Industrial America LLC, New Holland, PA (US)

( * ) Notice: Subject to any disclaimer, the term of this patent is extended or adjusted under 35 U.S.C. 154(b) by 126 days.

(21) Appl. No.: 15/252,789

(22) Filed: Aug. 31, 2016

(65) Prior Publication Data

US 2018/0054951 A1    Mar. 1, 2018

(51) Int. Cl.
| | |
|---|---|
| A01B 49/02 | (2006.01) |
| A01B 5/00 | (2006.01) |
| A01B 79/00 | (2006.01) |
| A01B 3/34 | (2006.01) |
| A01B 5/04 | (2006.01) |

(Continued)

(52) U.S. Cl.
CPC ............. *A01B 49/02* (2013.01); *A01B 3/34* (2013.01); *A01B 5/04* (2013.01); *A01B 15/02* (2013.01); *A01B 15/18* (2013.01); *A01B 79/00* (2013.01)

(58) Field of Classification Search
CPC ..... A01B 23/046; A01B 21/086; A01B 49/02; A01B 49/027; A01B 13/02; A01B 13/14; A01B 13/08; A01B 63/006; A01B 63/008; A01B 63/32; A01B 39/14; A01B 79/00; A01B 3/34; A01B 5/04; A01B 15/02; A01B 15/08; A01C 5/066
USPC ......... 111/118; 172/133, 140, 142, 146, 153, 172/156, 177, 178, 181, 582
See application file for complete search history.

(56) References Cited

U.S. PATENT DOCUMENTS

| | | | |
|---|---|---|---|
| 4,403,662 A * | 9/1983 | Dietrich, Sr. .......... | A01B 49/02 172/156 |
| 5,020,604 A * | 6/1991 | Peck .................... | A01B 49/027 111/118 |
| 5,080,178 A | 1/1992 | Dietrich, Sr. | |

(Continued)

FOREIGN PATENT DOCUMENTS

| | | |
|---|---|---|
| CN | 87 2 01565 U | 9/1988 |
| CN | 202455752 U | 10/2012 |

(Continued)

OTHER PUBLICATIONS

"True-Tandem Disk Harrows", CaseIH Agriculture, taken from www.caseih.com, Feb. 22, 2016 (16 pages).

*Primary Examiner* — Robert E Pezzuto
(74) *Attorney, Agent, or Firm* — Rebecca L. Henkel; Rickard K. DeMille (57) ABSTRACT

An agricultural tillage implement, comprising at least one section including a plurality of attachment bars; and a plurality of indexed seedbed tillage arrangements distributed on the at least one section, each indexed seedbed tillage arrangement including a first horizontal tillage apparatus coupled to a first attachment bar; a second horizontal tillage apparatus coupled to a second attachment bar and offset in the travel direction from the first horizontal tillage apparatus; and a vertical tillage apparatus coupled to a third bar of the plurality of bars and offset in the travel direction from the first and second horizontal tillage apparatuses, positioned such that it processes soil not disturbed by the first and second horizontal tillage apparatuses.

18 Claims, 5 Drawing Sheets

(51) Int. Cl.
*A01B 15/02* (2006.01)
*A01B 15/18* (2006.01)

(56) References Cited

U.S. PATENT DOCUMENTS

| | | | |
|---|---|---|---|
| 5,207,279 A * | 5/1993 | Nelson | A01B 23/046 172/140 |
| 6,612,378 B2 | 9/2003 | Sauder | |
| 6,763,896 B1 | 7/2004 | Hurtis | |
| 6,935,435 B1 * | 8/2005 | Shenk | A01B 39/14 172/582 |
| 7,017,675 B2 | 3/2006 | Ankenman et al. | |
| 7,549,482 B2 | 6/2009 | Wake et al. | |
| 8,016,044 B2 * | 9/2011 | Kromminga | A01B 49/02 172/133 |
| 8,047,299 B2 * | 11/2011 | Hurtis | A01B 63/32 172/140 |
| 8,074,728 B2 | 12/2011 | Kovach et al. | |
| 8,307,909 B1 | 11/2012 | Rozendaal et al. | |
| 2004/0149467 A1 | 8/2004 | Gilmer, Jr. et al. | |
| 2006/0021768 A1 * | 2/2006 | Ankenman | A01B 49/02 172/146 |
| 2012/0111588 A1 | 5/2012 | Smith et al. | |
| 2014/0123885 A1 | 5/2014 | Nance | |
| 2014/0149467 A1 | 5/2014 | Schnitman | |
| 2015/0208570 A1 | 7/2015 | Kovach et al. | |

FOREIGN PATENT DOCUMENTS

| | | |
|---|---|---|
| CN | 202514266 U | 11/2012 |
| FR | 2 763 471 A1 | 11/1998 |
| SU | 1762771 A1 | 9/1992 |

\* cited by examiner

INDEXED SEEDBED TILLAGE ARRANGEMENT

BACKGROUND OF THE INVENTION

1. Field of the Invention

The present invention relates to agricultural tillage tools, and, more particularly, to an indexed seedbed tillage tool.

2. Description of the Related Art

Farmers utilize a wide variety of tillage implements to prepare soil for planting. Some such implements include two or more sections coupled together to perform multiple functions as they are pulled through fields by a tractor. For example, a field cultivator is capable of simultaneously tilling soil and leveling the tilled soil in preparation for planting. A field cultivator has a frame that carries a number of ground-engaging tilling implements for tilling the soil. The field cultivator converts compacted soil into a level seedbed with a consistent depth for providing excellent conditions for planting of a crop. Residual crop material disposed on top of the soil is worked into the soil, and weeds or other undesired plants are destroyed and worked into the soil.

Tillage equipment prepares the soil by way of mechanical agitation of various types, such as digging, stirring, and overturning. Examples of tillage include plowing (overturning with moldboards or chiseling with chisel shanks), disking, harrowing, sweeping, and cultivating with cultivator shanks.

Seedbed tillage tools have been used in agricultural use for decades. Early-in row crops such as corn, where a good seedbed is a critical part of raising high-yielding corn, disk harrows were widely used in early years and over a period of time have been replaced by the field cultivator in order to create a more level seedbed.

Tillage is often classified into two types, vertical and horizontal. There are no strict definition of these two types; typically, though, vertical tillage is performed with implements such as colters or spider wheels. Horizontal tillage, on the other hand, is performed with implements such as sweeps. There are various beneficial and detrimental aspects of vertical and horizontal tillage, depending upon aspects of the situation including soil conditions, equipment, crops to be planted, etc.

One problem with horizontal tillage may include an abrupt change in the soil density as a result of soil compaction caused by "smearing", which could inhibit good root growth for a young plant such as corn, and result in a decrease of yield. Multiple equipment passes are sometimes necessary to achieve the desired seedbed, which is expensive in time and money as well as induces more soil compaction. A farmer must often compromise when selecting one or both of vertical and horizontal tillage.

Various remedies have been tried to address smearing such as broadcast vertical tillage and strip-tilling, but each has its own disadvantages as well. Broadcast vertical tillage must have a level surface prior to being used and may not adequately remove tire tracks, while strip-tilling must be performed under ideal conditions and difficulty in keeping a planter on the strips.

What is needed in the art is a seedbed tillage arrangement that combines the best results of vertical and horizontal tillage.

SUMMARY OF THE INVENTION

The present invention provides an agricultural tillage implement which includes an indexed seedbed tillage arrangement with vertical and horizontal tillage elements arranged such that the soil in seed rows is only prepared by the vertical tilling elements, and the soil between the seed rows is prepared by the horizontal tilling elements.

The present invention in one form is directed to an agricultural tillage implement, comprising at least one section including a plurality of attachment bars, and a plurality of indexed seedbed tillage arrangements distributed on at least one of the main section and one of the plurality of wing sections, each indexed seedbed tillage arrangement including a first horizontal tillage apparatus coupled to a first attachment bar, a second horizontal tillage apparatus coupled to a second attachment bar and offset in the travel direction from the first horizontal tillage apparatus, and a vertical tillage apparatus coupled to a third bar of the plurality of bars and offset in the travel direction from the first and second horizontal tillage apparatuses, positioned such that it processes soil not disturbed by the first and second horizontal tillage apparatuses.

The present invention in another form is directed to an indexed seedbed tillage arrangement of an agricultural tillage implement, the implement including at least one section including a plurality of attachment bars; the indexed seedbed tillage arrangement including a first horizontal tillage apparatus coupled to a first attachment bar, a second horizontal tillage apparatus coupled to a second attachment bar and offset in the travel direction from the first horizontal tillage apparatus, and a vertical tillage apparatus coupled to a third bar of the plurality of bars and offset in the travel direction from the first and second horizontal tillage apparatuses, positioned such that it processes soil not disturbed by the first and second horizontal tillage apparatuses.

The present invention in yet another form is directed to a method of tilling an agricultural field to prepare a seedbed, the method comprising providing a plurality of indexed seedbed tillage arrangements of an agricultural tillage implement, the implement including at least one section including a plurality of attachment bars, each indexed seedbed tillage arrangement including a first horizontal tillage apparatus coupled to a first attachment bar, a second horizontal tillage apparatus coupled to a second attachment bar and offset in the travel direction from the first horizontal tillage apparatus, and a vertical tillage apparatus coupled to a third bar of the plurality of bars and offset in the travel direction from the first and second horizontal tillage apparatuses, positioned such that it processes soil not disturbed by the first and second horizontal tillage apparatuses, and operating the agricultural tillage implement along at least one path of the agricultural field.

An advantage of the present invention is that it combines the best attributes of vertical and horizontal tillage without the need for changing tools or multiple passes.

Another advantage of the present invention is enhanced soil leveling over broadcast tillage tools utilizing the field cultivator sweeps in a large portion of the area and provides weed control behind the sweeps.

Another advantage of the present invention is that an undisturbed row of soil is vertically tilled, thereby eliminating sweep smear and minimizing soil density changes in the prepared seedbed.

Still another advantage of the present invention is the ability to operate in high levels of residue.

Yet another advantage of the present invention is the ability to adapt to current primary tillage tools.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
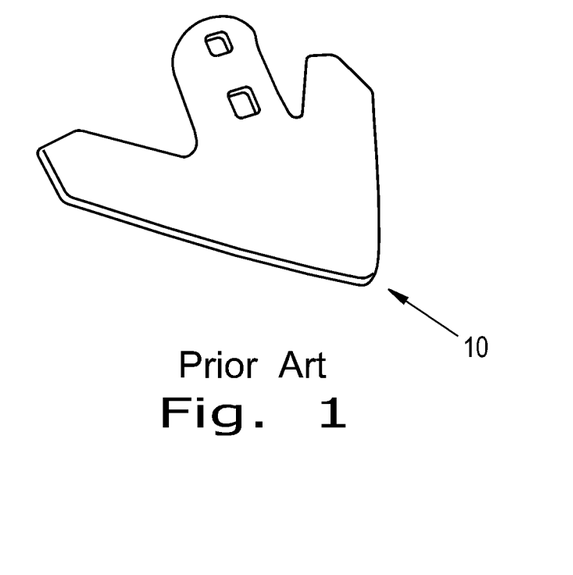
FIG. 1 is a prior art example of a horizontal tillage implement in the form of a sweep.

Referring now to FIG. 1, there is shown a prior art example of a horizontal tillage implement in the form of a sweep 10. Sweeps are well-known in the art of horizontal agricultural tillage, and are typically used to eliminate weeds and other undesirable vegetation in order to prepare a seedbed. Sweeps cut vegetation at or below the root level, turn over soil, and assist in herbicide incorporation.

Figure 2:
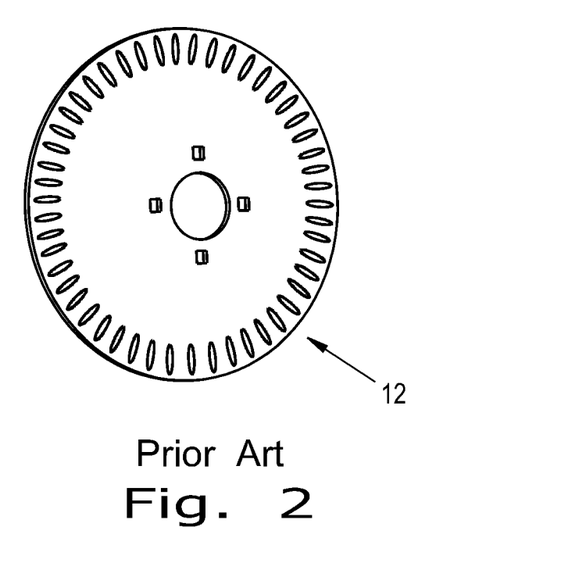
FIG. 2 is a prior art example of a vertical tillage implement in the form of a fluted colter.

Referring now to FIG. 2, there is shown a prior art example of a vertical tillage implement in the form of a fluted colter 12. Colters (also spelled "coulters") are well-known in the art of vertical agricultural tillage, and are typically used to break through and turn over soil. Colters come in a variety of configurations; including plain, wavy, fluted, notched, etc.

Although sweeps are illustrated as examples of horizontal tillage implements and colters are illustrated as vertical tillage implements, such illustrations are not meant to limit the scope of the invention. Other types of vertical and horizontal tillage implements can be placed in the inventive indexed arrangement as described below and still fall within the scope of the invention.

Figure 3:
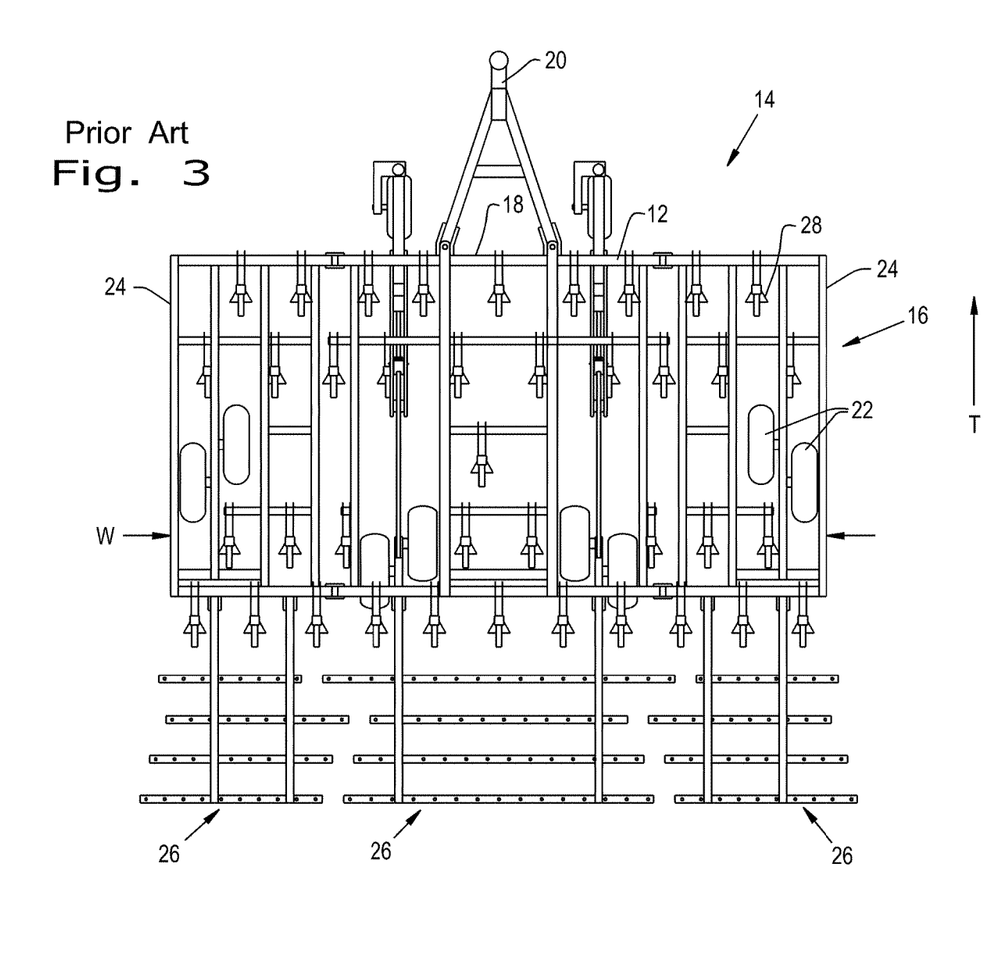
FIG. 3 is an overhead view of a prior art example of a seedbed tillage arrangement on an agricultural tillage implement.

Now referring to FIG. 3, a prior art example of a an agricultural tillage implement 14 is illustrated. Prior art agricultural tillage implement 14 includes seedbed tillage arrangement 16, main section 18, tow hitch 20, wheels 22, wing sections 24, and harrows 26. Additionally, and not illustrated, agricultural tillage implement 14 may be configured with a crumbler, rolling basket, or other implements in addition to or in lieu of the harrows 26.

Prior art seedbed tillage arrangement 16 can include ground-engaging sweeps 28 distributed throughout main section 18 and wing sections 24. As seen in FIG. 3, the sweeps 28 are arranged in a staggered manner so that when agricultural tillage implement 14 is pulled in a travel direction T, the soil in the path along the entire width W is disturbed by the sweeps 28. Harrows 26 then further disturb the soil, smoothing the surface to make it uniform and amenable to planting.

Figure 4:
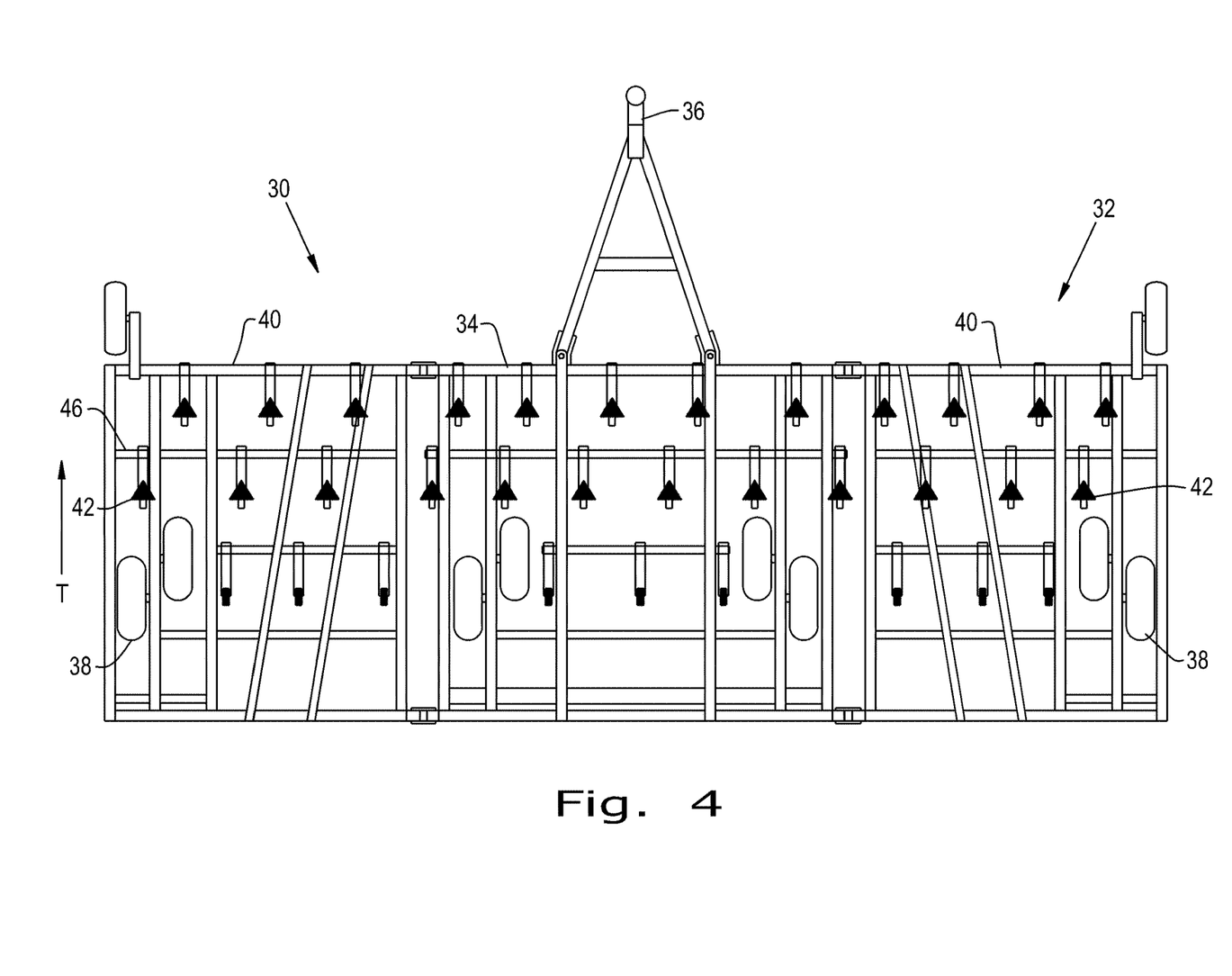
FIG. 4 is a an overhead view of a an agricultural tillage implement which includes an embodiment of an indexed seedbed tillage arrangement of the present invention.

Now referring to FIG. 4, agricultural tillage implement 30 is illustrated according to the present invention. Agricultural tillage implement 30 includes indexed seedbed tillage arrangements 32, main section 34, tow hitch 36, wheels 38, and wing sections 40. Main section 34 and wing sections 40 include bars 46. Additionally, and not illustrated, agricultural tillage implement 30 may be configured with a harrow, crumbler, rolling basket, or other agricultural implements in any combination.

Figure 5:
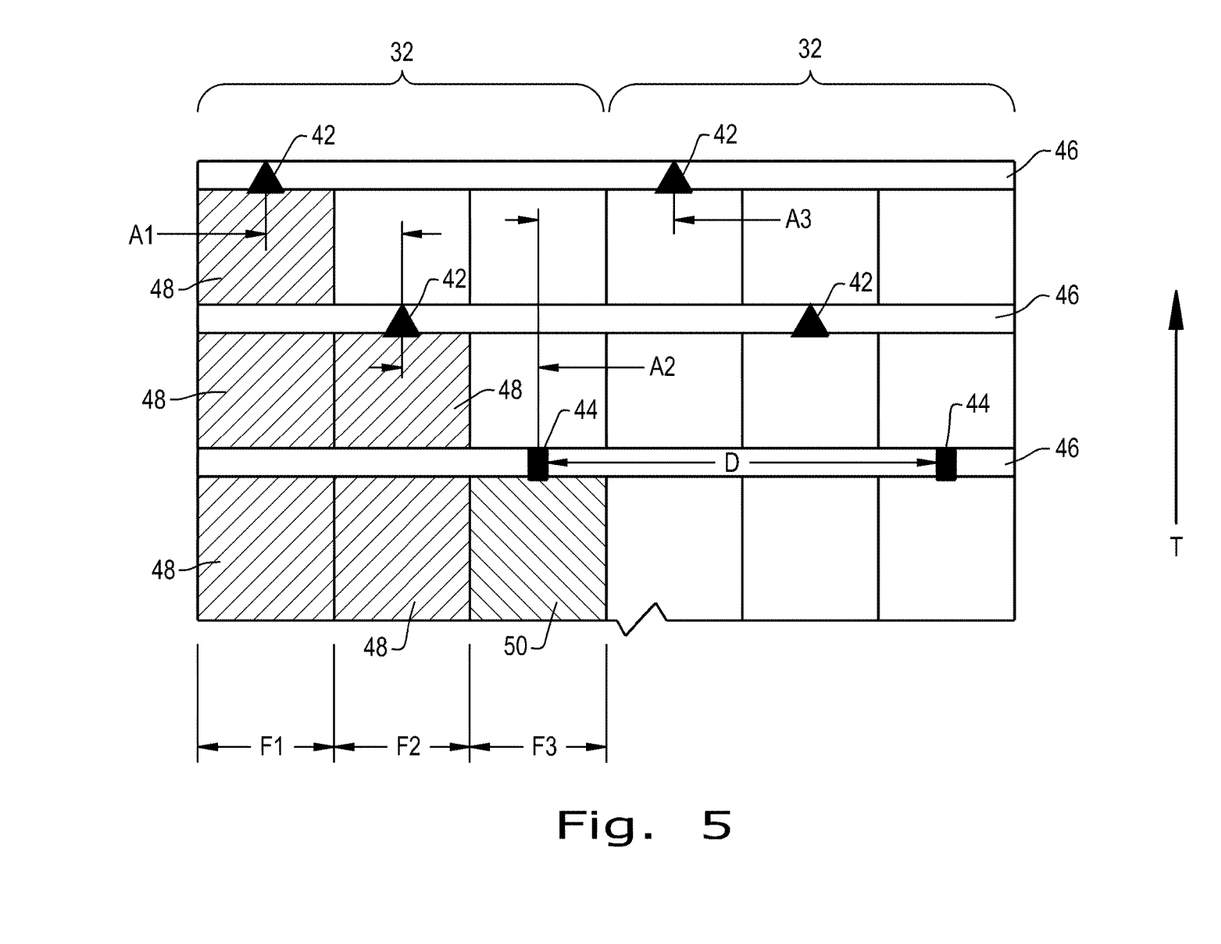
FIG. 5 is a detail of the agricultural tillage implement of FIG. 4 which illustrates two adjacent indexed seedbed tillage arrangements.

Now referring to FIG. 5 with continued referral to FIG. 4, the inventive indexed seedbed tillage arrangement 32 is illustrated by detailing two adjacent arrangements, although any number of indexed seedbed tillage arrangements 32 can be provided in accordance with the invention.

Indexed seedbed tillage arrangement 32 can include horizontal tillage implements 42 and vertical tillage implements 44 removably coupled to attachment bars 46. Attachment bars 46 may be continuous, as illustrated, or of varying lengths. Horizontal tillage implements 42 are removably coupled on separate attachment bars 46 at a distance A1, the distance measure perpendicular to the travel direction T. In turn, vertical tillage implements 44 are removably coupled to attachment bars 46 at a distance A2 from the nearest horizontal tillage implement 42, the distance measure perpendicular to the travel direction T. The distance A1 is equal to the distance A2.

For two indexed seedbed tillage arrangement 32 adjacent to each other as illustrated in FIG. 5, the distance A3 measured perpendicularly to the travel direction T between the vertical tillage implement 44 of the first indexed seedbed tillage arrangement 32 and the nearest horizontal tillage implement 42 of the adjacent indexed seedbed tillage arrangement 32 is equal to A1 and therefore also equal to A2.

As a result of the advantageous distribution of horizontal and vertical tillage implements described herein, each indexed seedbed tillage arrangement 32 produces rows of horizontally-tilled soil 48 of widths F1 and F2, and a row of vertically-tilled soil 50 of width F3. It can therefore be seen that the vertical tillage implement 44 of each indexed seedbed tillage arrangement 32 operates in soil that has not been disturbed by any horizontal tillage implements 42, thereby providing advantages previously disclosed herein.

In an advantageous arrangement, A1=A2=A3=F1=F2=F3=10 inches, which results in the vertical tillage implements 44 being 30 inches from one another in adjacent indexed seedbed tillage arrangements 32. Therefore, the prepared seedbed rows are 30 inches away from each other, shown as distance D in FIG. 5.

Figure 6:
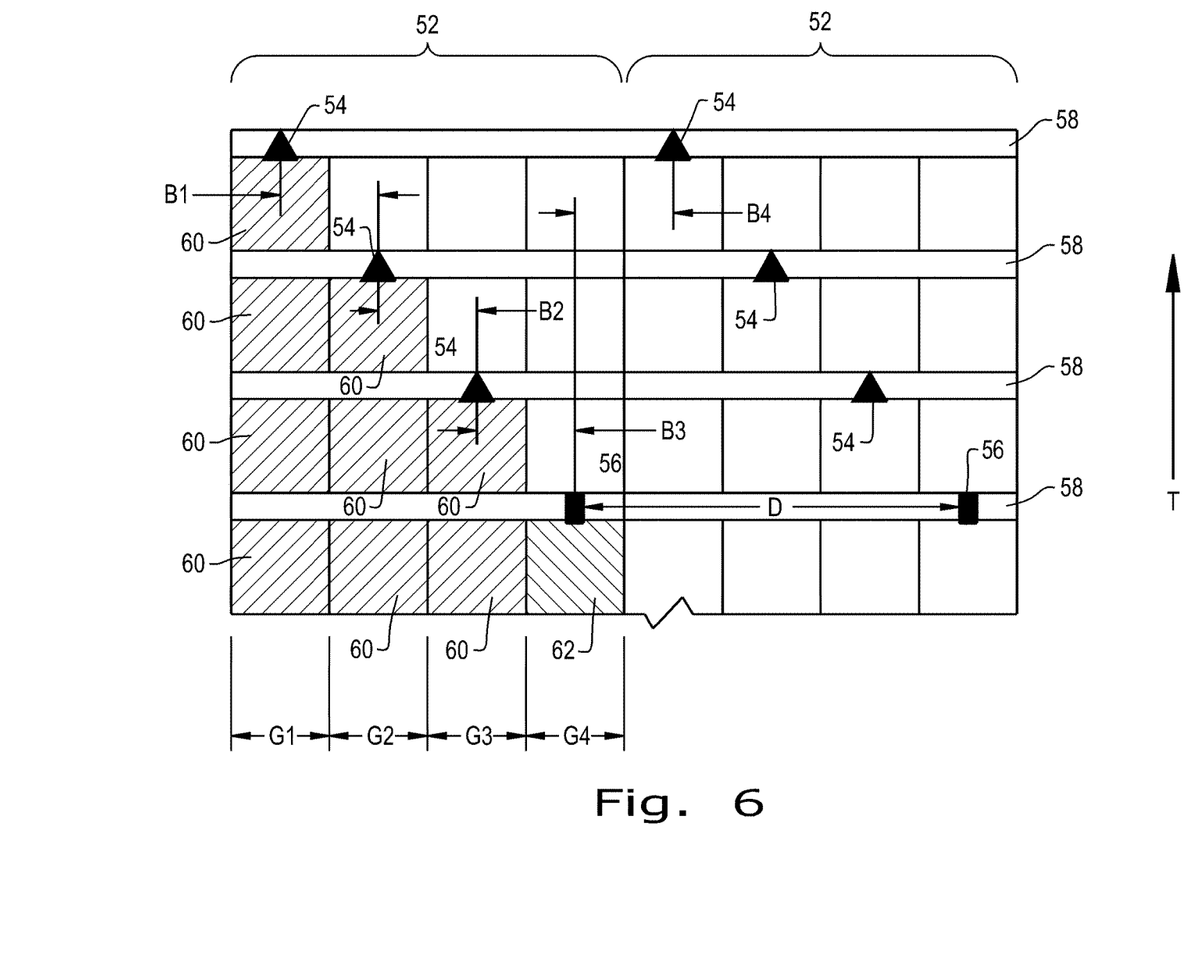
FIG. 6 is a detail illustrating two adjacent indexed seedbed tillage arrangements of an alternate embodiment of an indexed seedbed tillage arrangement of the present invention.

Now referring to FIG. 6 with continued referral to FIG. 4, an alternate embodiment of an inventive indexed seedbed tillage arrangement 52 is illustrated by detailing two adjacent arrangements, although any number of indexed seedbed tillage arrangements 52 can be provided in accordance with the invention.

Indexed seedbed tillage arrangement 52 can include horizontal tillage implements 54 and vertical tillage implements 56 removably coupled to attachment bars 58. Attachment bars 58 may be continuous, as illustrated, or of varying lengths. Horizontal tillage implements 54 are removably coupled on separate attachment bars 58 at a distance B1 and B2 from each other, the distance measure perpendicular to the travel direction T. In turn, vertical tillage implements 56 are removably coupled to attachment bars 58 at a distance B3 from the nearest horizontal tillage implement 54, the distance measure perpendicular to the travel direction T. The distance B1 is equal to the distance B2, and the distance B2 is equal to the distance B3.

For two indexed seedbed tillage arrangement 32 adjacent to each other as illustrated in FIG. 5, the distance B4 measured perpendicularly to the travel direction T between the vertical tillage implement 56 of the first indexed seedbed tillage arrangement 52 and the nearest horizontal tillage implement 54 of the adjacent indexed seedbed tillage arrangement 52 is equal to B1 and therefore also equal to B2 and B3.

As a result of the advantageous distribution of horizontal and vertical tillage implements described herein, each indexed seedbed tillage arrangement 52 produces rows of horizontally-tilled soil 60 of widths G1 and G2 and G3, and a row of vertically-tilled soil 62 of width G4. It can therefore be seen that the vertical tillage implement 56 of each indexed seedbed tillage arrangement 52 operates in soil that has not been disturbed by any horizontal tillage implements 54, thereby providing advantages previously disclosed herein.

In an advantageous arrangement, B1=B2=B3=B4=G1=G2=G3=G4=7.5 inches, which results in the vertical tillage implements 56 being 30 inches from one another in adjacent indexed seedbed tillage arrangements 52. Therefore, the prepared seedbed rows are 30 inches away from each other, shown as distance E in FIG. 6.

Although the distance between prepared seedbed rows of 30 inches is used in the inventive embodiments, it is to be understood that any other distances between seedbed rows may be used and remain in the spirit and scope of the present invention.

It is to be understood that various configurations can be used to obtain the inventive result of indexed horizontal and vertical tillage implements, yet fall within the scope of the invention. For example, the implements may be arranged in a different manner yet still result in a seedbed row processed only by a vertical tillage implement, with the soil between the seedbed rows processed by horizontal tillage implements. Another example falling within the scope of the invention, but not illustrated, is a single vertical tillage implement ahead of and in line with a trailing vertical tillage implement.

While improved agricultural tillage tools have been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural tillage implement, comprising:
   at least one section including a plurality of attachment bars, the plurality of attachments including at least a first attachment bar, a second attachment bar, and a third attachment bar; and
   a plurality of indexed seedbed tillage arrangements distributed on the at least one section, each indexed seedbed tillage arrangement including:
      a first horizontal tillage apparatus coupled to the first attachment bar of the plurality of attachment bars;
      a second horizontal tillage apparatus coupled to the second attachment bar of the plurality of attachment bars, the second attachment bar positioned behind the first attachment bar relative to a longitudinal travel direction, the second horizontal tillage apparatus offset transversely relative to a longitudinal travel direction from the first horizontal tillage apparatus, wherein no horizontal or vertical tillage apparatus is positioned behind the first horizontal tillage apparatus on the second attachment bar to re-till the soil tilled by the first horizontal tillage apparatus; and
      a vertical tillage apparatus coupled to the third bar of the plurality of attachment bars, the third attachment bar positioned behind the second attachment bar relative to the longitudinal travel direction and offset transversely relative to the longitudinal travel direction from first and second horizontal tillage apparatuses, the vertical tillage apparatus positioned such that no horizontal or vertical tillage apparatus attached to the agricultural tillage implement has tilled the soil prior to the passage of the vertical apparatus over the soil, while soil ahead of but transversely positioned relative to a position of the vertical tillage apparatus is tilled by the first horizontal apparatus and the second horizontal tillage apparatus before the soil is tilled by the vertical tillage apparatus when the agricultural tillage implement moves in the longitudinal travel direction when operating to till the soil, wherein no horizontal or vertical tillage apparatus is positioned behind the second horizontal tillage apparatus on the third attachment bar to re-till the soil tilled by the second horizontal tillage apparatus, and wherein no horizontal or vertical tillage apparatus is positioned on an additional attachment bar of the plurality of attachment bars positioned behind the third attachment bar to re-till the soil tilled by the vertical tillage apparatus.

2. The agricultural tillage implement of claim 1, wherein the first and second horizontal tillage apparatuses are sweeps.

3. The agricultural tillage implement of claim 1, wherein the vertical tillage apparatus is at least one colter.

4. The agricultural tillage implement of claim 1, wherein the vertical tillage apparatus is at least one spider wheel.

5. The agricultural tillage implement of claim 1, wherein the first horizontal tillage apparatus, the second horizontal tillage apparatus, and the vertical tillage apparatus are equally spaced apart transversely relative to each other, and wherein each area of tilled soil generated by the first horizontal tillage apparatus, the second horizontal tillage apparatus, and the vertical tillage apparatus are transversely equal in size.

6. The agricultural tillage implement of claim 1, wherein the at least one section is a foldable wing section.

7. The agricultural tillage implement of claim 1, wherein a distance measured perpendicular to the travel direction between adjacent vertical tillage apparatuses is 30 inches.

8. The agricultural tillage implement of claim 1, wherein the offset is 10 inches.

9. The agricultural tillage implement of claim 5, wherein the offset is 7.5 inches.

10. An agricultural tillage implement, comprising:
    at least one section including a plurality of attachment bars, the plurality of attachments including at least a first attachment bar, a second attachment bar, a third attachment bar, and a fourth attachment bar; and
    a plurality of indexed seedbed tillage arrangements distributed on the at least one section, each indexed seedbed tillage arrangement including:

a first horizontal tillage apparatus coupled to the first attachment bar of the plurality of attachment bars;

a second horizontal tillage apparatus coupled to the second attachment bar of the plurality of attachment bars, the second attachment bar positioned behind the first attachment bar relative to a longitudinal travel direction, the second horizontal tillage apparatus offset transversely relative to the longitudinal travel direction from the first horizontal tillage apparatus, wherein no horizontal or vertical tillage apparatus is positioned behind the first horizontal tillage apparatus on the second attachment bar to re-till the soil tilled by the first horizontal tillage apparatus;

a third horizontal tillage apparatus coupled to the third attachment bar of the plurality of attachment bars, the third attachment bar positioned behind the second attachment bar relative to the longitudinal travel direction, the third horizontal tillage apparatus offset transversely relative to the longitudinal travel direction from the first horizontal tillage apparatus and the second horizontal tillage apparatus, wherein no horizontal or vertical tillage apparatus is positioned behind the second horizontal tillage apparatus on the third attachment bar to re-till the soil tilled by the first horizontal apparatus or the second horizontal tillage apparatus;

a vertical tillage apparatus coupled to the fourth bar of the plurality of attachment bars, the fourth attachment bar positioned behind the third attachment bar relative to a longitudinal travel direction and offset transversely relative to the longitudinal travel direction from first, second, and third horizontal tillage apparatuses, the vertical tillage apparatus positioned such that no horizontal or vertical tillage apparatus attached to the agricultural tillage implement has processed the soil prior to the passage of the vertical tillage apparatus over the soil, while soil ahead of but transversely positioned relative to a position of the vertical tillage apparatus is tilled by the first horizontal apparatus, the second horizontal tillage apparatus, and the third horizontal apparatus before the soil is tilled by the vertical tillage apparatus when the agricultural tillage implement moves in the longitudinal travel direction when operating to till the soil, wherein no horizontal or vertical tillage apparatus is positioned behind the third horizontal tillage apparatus on the fourth attachment bar to re-till the soil tilled by the third horizontal tillage apparatus, and wherein no horizontal or vertical tillage apparatus is positioned on an additional attachment bar of the plurality of attachment bars positioned behind the fourth attachment bar to re-till the soil tilled by the vertical tillage apparatus.

11. The agricultural tillage implement of claim 10, wherein the first and second horizontal tillage apparatuses are sweeps.

12. The agricultural tillage implement of claim 10, wherein the vertical tillage apparatus is at least one colter.

13. The agricultural tillage implement of claim 10, wherein the vertical tillage apparatus is at least one spider wheel.

14. The agricultural tillage implement of claim 10, wherein the first horizontal tillage apparatus, the second horizontal tillage apparatus, the third horizontal tillage apparatus, and the vertical tillage apparatus are equally spaced apart transversely relative to each other, and wherein each area of tilled soil generated by the first horizontal tillage apparatus, the second horizontal tillage apparatus, the third horizontal tillage apparatus, and the vertical tillage apparatus are transversely equal in size.

15. The agricultural tillage implement of claim 10, wherein the at least one section is a foldable wing section.

16. The agricultural tillage implement of claim 10, wherein a distance measured perpendicular to the travel direction between adjacent vertical tillage apparatuses is 30 inches.

17. The agricultural tillage implement of claim 10, wherein the offset is 10 inches.

18. The agricultural tillage implement of claim 14, wherein the offset is 7.5 inches.

* * * * *